(12) United States Patent
Wong et al.

(10) Patent No.: US 6,989,433 B2
(45) Date of Patent: Jan. 24, 2006

(54) LOW STRESS CONFORMAL COATINGS OF RELIABILITY WITHOUT HERMETICITY FOR MICROELECTROMECHANICAL SYSTEM BASED MULTICHIP MODULE ENCAPSULATION

(75) Inventors: Ching Ping Wong, Berkeley Lake, GA (US); Jiali Wu, Yorktown Heights, NY (US)

(73) Assignee: Georgia Tech Research Corp., Atlanta, GA (US)

( * ) Notice: Subject to any disclaimer, the term of this patent is extended or adjusted under 35 U.S.C. 154(b) by 301 days.

(21) Appl. No.: 10/141,334

(22) Filed: May 8, 2002

(65) Prior Publication Data

US 2003/0087025 A1 May 8, 2003

Related U.S. Application Data

(60) Provisional application No. 60/289,369, filed on May 8, 2001.

(51) Int. Cl.
*C08G 59/02* (2006.01)

(52) U.S. Cl. .................... 528/418; 525/476; 525/479; 428/413

(58) Field of Classification Search ................ 528/418; 525/476, 479; 428/413
See application file for complete search history.

(56) References Cited

U.S. PATENT DOCUMENTS 5,108,824 A * 4/1992 Wang et al. .................. 428/76
6,172,141 B1 1/2001 Wong et al. ................ 523/455
6,180,696 B1 1/2001 Wong et al. ................ 523/457
6,380,322 B1 4/2002 Wong et al. ................ 525/423
6,498,260 B2 12/2002 Wang et al. ................ 549/547
6,525,322 B2 2/2003 Wong et al. ............ 250/363.09
6,544,651 B2 4/2003 Wong et al. ................ 428/413
6,570,029 B2 5/2003 Wang et al. ................ 549/547

* cited by examiner

*Primary Examiner*—Kuo-Liang Peng
(74) *Attorney, Agent, or Firm*—Thomas, Kayden, Horstemeyer & Risley LLP; Charles Vorndran; Todd Deveau (57) ABSTRACT

The present invention provides low stress non-hermetic conformal coatings for the protection of microelectronic devices, such as a Microelectromechanical system (MEMS) based multichip module from adverse environments. The induced stress from these two coatings due to the thermal cycling and manufacture processing will not cause any influence on sensing accuracy of the piezopressure sensor or similar functional MEMS devices. Furthermore, the conformal coatings have the merits of low glass transition temperature, good elongation, low moisture uptake and mobile ion permeation, room temperature curability and good contamination resistance to the jet fume, which promise a high reliability for the aerospace and avionics application. One conformal coating comprises a composition/formulation containing a rubber, siloxane or urethane oligomer modified epoxy and an organic hardener, and optionally an organic diluent and a curing catalyst. Another conformal coating comprises a composition/formulation containing a silicone elastomer or gel and a metal chelate catalyst, and optionally a silica filler, a diluent and an adhesion promoter or coupling agent.

10 Claims, 10 Drawing Sheets

LOW STRESS CONFORMAL COATINGS OF RELIABILITY WITHOUT HERMETICITY FOR MICROELECTROMECHANICAL SYSTEM BASED MULTICHIP MODULE ENCAPSULATION

CROSS REFERENCE TO RELATED APPLICATION

This application claims benefit of priority to U.S. provisional application Ser. No. 60/289,369 entitled "LOW STRESS CONFORMAL COATINGS OF RELIABILITY WITHOUT HERMETICITY FOR MICROELECTROMECHANICAL SYSTEM BASED MULTICHIP MODULE ENCAPSULTION" filed on May 8, 2001.

STATEMENT REGARDING FEDERALLY SPONSORED RESEARCH OR DEVELOPMENT

This invention was made in part with government support under Defense Advanced Research Projects Agency contract number F30602-97-2-0099. Therefore, the government may have certain rights in the invention.

BACKGROUND OF THE INVENTION

1. Field of the Invention

This invention is directed to the field of polymers, in particular, to polymers used as protective coatings in electronics.

2. Background of the Invention

Microelectromechanical systems, or MEMS, is an emerging technology that may fundamentally affect every aspect of our lives. The hallmark of the next thirty years of the silicon revolution will likely be the incorporation of new types of functionality onto microelectronic devices including structures that will enable the devices to think, sense, act and communicate. This revolution will be enabled by MEMS. Currently, automobile accelerometers, medical equipment, and sensing systems utilizing MEMS technology have already been commercialized, and fiber communication technology will accommodate a large potential market for the use of MEMS devices in the immediate future. However, one of the major issues of today's MEMS technology is the packaging that provides mechanical and environmental protection to MEMS devices. Unlike integrated circuits (ICs), the packaging for MEMS is much more difficult, because most MEMS devices have complex topography and delicate moving parts which need to be protected but not affected/hampered by the package. Accordingly, there is a need for materials having unique properties enabling them to protect MEMS devices.

Examples of sensors that need such protection include a multi-chip module containing a piezopressure sensor fabricated with MEMS technology and analogue/digital driving IC's. The most challenging task, besides conventional packaging issues, is to protect the MEMS sensor against adverse environmental conditions without affecting the moving parts and sensitivity. All the sensors typically experience extreme temperature variation (−55~140° C.), mechanical shock and vibration, high humidity, jet fume contamination, and UV radiation, etc. Therefore, a multifunctional conformal coating capable of withstanding these conditions is needed. In terms of the concerns from different aspects of aerospace and avionics applications, to monitor the static pressure on the wings, tail, nacelle, engine, and other interested sites of the body of an aircraft during flight test, the desired conformal coating should be of excellent resistance to moisture ingress, mobile ion (such as $Na^+$, $K^+$, $Li^+$, $Cl^-$) permeation, low internal stress, good adhesion, planarization as well as good resistance to jet fuel contamination.

Generally, many polymeric resins have been used commercially for microelectronic device encapsulation. Epoxy resins and silicone elastomers have been used most extensively to provide the requisite characteristics required by the electronics industry. Yet, in spite of the popularity that epoxy resins and silicone elastomers have enjoyed commercially as microelectronics device glob-top or potting resins, epoxy resins and silicones elastomer prepared for MEMS based multichip module of aerospace and avionics applications is still a new and challenging area.

Epoxy resins have excellent adhesion properties and resistance to aggressive chemicals. However, high cross-linking density induced stress is a well-known key factor in the failure of fragile microelectronic devices and the stress sensitive MEMS based devices. Furthermore, the extreme working temperature for aerospace application is from −55° C. to 140° C., and no obvious mechanical property change can be allowed in this temperature window. No qualified epoxy resin is currently available that can withstand these adverse conditions.

Silicones, as typically pliable elastomer materials, can function as durable dielectric insulation, as barriers against environmental contamination, and as stress relieving shock/vibration absorbers over a wide humidity/temperature range. However, the intrinsic low polar structure of silcones lowers their contamination resistance to contamination including aliphatic hydrocarbons, for example, octane, etc. Currently, commercially available silicone elastomers can not meet the aforementioned requirements either.

Accordingly, there is a need for a low stress epoxy, having an internal stress from thermal cycling and manufacturing which will not influence the sensing accuracy of a MEMS based pressure sensor.

There is another need for a low stress epoxy with a glass transition temperature (Tg) lower than −60° C.

There is still another need for a low stress epoxy with low viscosity and self air degassing.

There is yet another need for a silicone elastomer, preferably a two-component elastomer, with improved jet fume contamination resistance, a Tg of at least about −60° C. to about −120° C.

There is another need for a two-component silicone elastomer with room temperature curability.

There is another need for a low viscosity two component silicone elastomer with good wetting and self air degassing characteristics for avoiding any voids trapped during processing.

SUMMARY OF THE INVENTION

The present invention overcomes the limitations of existing technology and addresses the needs therein by providing low stress conformal coatings. In one aspect of the invention, low stress conformal coatings are provided by introducing a flexible, but durable, molecular segment into the polymeric structure, yielding a conformal coating having a low glass transition temperature (Tg), and low storage modulus, preferably lower than about 65 MPa, as well as the intrinsic merits and characteristics of epoxy. The conformal coatings can have varying amounts of diluent to decrease viscosity and decrease the storage modulus.

Another aspect of the present invention provides a curable epoxy composition for forming a conformal coating, the composition including an elastomer modified epoxy base resin, wherein the base resin in about 44 to about 70 wt % epoxy and from about 20 to 35 wt % elastomer; a diluent, wherein the diluent is about 0 to about 30 wt %; a catalyst; and a hardener. The epoxy base resin can be modified with elastomers, including but not limited to rubber, silicone, urethane oligomers, carboxylic acid terminated butadiene acrylonitrile (CTBN), polycarboxylic acid terminated butadiene acrylonitrile, epoxide terminated butadiene acryonitrile, siloxane modified epoxy, siloxane modified amine, epoxide polyurethane and mixtures thereof.

Suitable diluents include compounds that decrease viscosity and storage modulus of the cured modified epoxy resin and can include but are not limited to flexible aliphatic epoxide, aliphatic diepoxide, aliphatic multiepoxide, and mixtures thereof. The diluents can be branched or unbranched. Suitable catalysts can include tertiary amines, tertiary phosphines, imidazole and its derivatives, imidazolium salts, onium salts and the mixtures thereof. Suitable hardeners can include low molecular weight and high reactivity liquid acids.

Another aspect of the invention provides a conformal coating formed by reacting an elastomer modified epoxy base resin, wherein the base resin in about 44 to about 70 wt %; a diluent, wherein the diluent is about 0 to about 30 wt %; a catalyst; and a hardener.

Yet another aspect provides a kit for forming a conformal coating, the kit including an elastomer modified epoxy base resin, wherein the base resin in about 44 to about 70 wt %; a diluent, wherein the diluent is about 0 to about 30 wt %; a catalyst; and a hardener. The kits can be used for single or multiple conformal coating applications.

Still another aspect of the present invention provides a silicone-based conformal coating having fuel contamination resistance, particularly to jet fuel and engine exhaust. The conformal coating can have an amount of inorganic filler sufficient to impart fuel contamination resistance to the conformal coating. Additional aspects of the silicone based conformal coatings can include room temperature curability, good adhesion, and low stress and also low glass transition temperature (Tg). Low Tg means lower than about −55° C., preferably lower than about −60° C., most preferably about −60° C. to about −120° C.

Other aspects of the present invention include a curable silicone composition for preparing a conformal coating, the composition including a silicone base resin; a catalyst; a filler in an amount sufficient to impart fuel contamination resistance; a coupling agent or adhesion promoter, and optionally, a diluent. Suitable silicone base resins include vinyl terminated siloxane, hydrogen terminated siloxane, fluoronated siloxane. Suitable catalysts can include metal chelate catalysts, preferably platinum catalysts. Suitable fillers include inorganic fillers, preferably silica. The silica can be spherical with a diameter from about 1 mm to about 50 mm. Exemplary coupling agents or adhesion promoters include silane coupling agents, titanates and zironates. Exemplary diluents can include low boiling point organic solvents, including hexane, cyclohexane, xylene, toluene, methyl ethyl ketone, and acetone.

Yet another aspect of the present invention provides a kit for preparing a conformal coating, the kit including a silicone base resin, a catalyst; a filler in an amount sufficient to impart fuel contamination resistance; and an adhesion promoter.

Still another aspect provides a conformal coating having a storage modulus of less than about 65 MPa, a glass transition temperature (Tg) lower than about −55° C., a surface insulative resistance smaller than about $10^8$ Ohms after subjected to the environment of 85° C. and 85% relative humidity for 1000 hrs, and resistant to contamination by jet fume.

Another aspect of the present invention provides a method for protecting electronic devices, the method including applying the conformal coatings described herein to the devices, preferably to microelectromechanical devices.

The conformal coatings of the present invention can be used for the protection of microelectronic devices, such as a Microelectromechanical system (MEMS) based multichip module from adverse environments. Various other features and advantages of the present invention will become apparent upon reading and understanding the present specification when taken in conjunction with the appended drawings.

BRIEF DESCRIPTION OF THE DRAWINGS

FIG. 5 is a scanning electronics micrograph of exemplary low stress epoxies. A detailed postfailure examination of the fracture specimens was also carried out using a scanning electron microscope (SEM). Panels (A), (B), and (C) show the general appearance of the initial crack region of the fractured samples.

DETAILED DESCRIPTION OF THE INVENTION

One embodiment of the present invention provides a low stress epoxy formed through the polymerization between an epoxide and carboxylic acid and the side reaction of etherification between hydroxy groups. For the purpose of low internal stress, the storage modulus of the epoxies can be controlled to be less than 65 MPa. To achieve such a storage modulus, an elastomer including rubber, siloxane elastomer or urethane oligomer segments can be introduced into the epoxy system to modify the epoxy base resin. An exemplary weight percentage concentration of elastomer modifier segment, including but not limited to rubber, siloxane elastomer, or urethane oligomer, can be from about 25 wt % to about 70 wt % of the base resin.

For the control of rheology of the formulated resins, a diluent, preferably either a low molecular epoxy or an alcohol, can be added to reduce the viscosity of the formulation. Suitable diluents include but are not limited branched or unbranched aliphatic epoxies, branched or unbranched aliphatic diepoxies, and the like. A catalyst with a concentration of about 0.5~5 wt % of base resin can be added to accelerate the polymerization. A exemplary cure procedure of the formulated resin can be within about 25° C. to about 150° C. with a variety of curing times depending on the bulky volume of the resin or addition of catalyst.

The rubber, silicone elastomer or urethane oligmer segments can be selected from: 1) a blend of carboxylic acid terminated butadiene homopolymers and acrylonitrile-butadiene copolymers (CTBN) bearing free carboxyl groups with aliphatic or aromatic epoxy, the carboxyl content of which can be from about 1.9% to about 2.9%, and the acrylonitrile content from about 0 up to about about 18%; 2) an epoxy-capped blend of carboxylic acid terminated butadiene homopolymers and acrylonitrile-butadiene copolymers bearing free carboxyl groups, the carboxyl content of which can be from about 1.9% to about 2.9%, and the acrylonitrile content from about 0 up to about 18%; 3) a siloxane modified dual-end type epoxy; 4) a siloxane modified side chain dual-ended type epoxy; and) an epoxy-capped polyurethane.

In another embodiment, the epoxy resin, preferably a bisphenol A resin, is adducted to an elastomer having a Tg of −30° C. or below, preferably −40° C. or below. Suitable elastomers include carboxyl-terminated poly(butadiene-co-acrylonitrile), commonly abbreviated as CTBN or CTBN rubber. Epoxy/rubber adducts are known in the art. In one embodiment, to provide the necessary flexibilizing for cold-temperature resistance, the CTBN component should be present at about 5 wt % of the total of the CTBN and the epoxy components to about 70 wt % CTBN. The elastomer component can be chemically bound to the epoxy component, i.e., by esterification reaction of the carboxyl groups of the CTBN with epoxy groups to ensure that a complete phase separation does not occur during fusion and curing of the coating powder. Butadiene-acrylonitrile copolymers are available with epoxy-terminated (ETBN), carboxy-terminated (CTBN), amino-terminated (ATBN) and vinyl-terminated (VTBN) functionalities.

Suitable epoxy base resins are described in 6,380,322 to Wong et al. and in Epoxy Resin Handbook, (1972) Park Ridge, N.J. both of which are incorporated by reference in their entirety.

A diluent can also be added to the above formulation to decrease viscosity. A preferred concentration of diluent is from 0 up to about 30 wt % of the base resin. Suitable diluents include mono- or di-epoxide, mono- or di-alcohol, for example, 1,3-isopantediol, ethylene glycol diglycidyol ether, ethylene glycol, 3-{bis(glycidyloxymethyl)-methyl]-1,2-propanedial tetra(ethylene glycol), 2-(hydroxymethyl)-13-propanediol, diglycidyl ether of 1,3-isopantediol, and the like.

Additionally, a catalyst can be added to the above formulation. Suitable catalysts include tertiary amine, tertiary phosphine, imidazole and its derivatives, imidazolium salts, onium salts and the mixture thereof, e.g. 2-methylimidazole, 2-phenylimidazole, 2-ethyl-4-methyl imidizole, tetraphenyl phosphonium tetraphenylborate, N,N-dimethyl-m-toluidine, N,N-dimethyl-p-toluidiene, and the like.

In one embodiment, the rubber or elastomer particles can precipitate and form a discrete elastic phase in the epoxy matrix during polymerization. With the variation of diluent concentration, the rubbery particle size and distribution change, correspondingly. Particle distribution mode changes from single mode to multi-size mode with the epoxide diluent concentration varied from about 0 to about 30 wt % of the base resin. The rubbery (elastomeric) particles can promote the absorption of strain energy by complex interactions, which can involve both craze formation and shear deformations. The overall mechanism can be influenced by the size of the microscopic rubbery (elastomeric) particles. Shear deformations are dominant in epoxy resins toughened by small particles, while the crazing mechanism is promoted by larger particles. Maximum toughness is generally found under conditions which produce both shear deformations and craze formations. Thus, systems containing large and small rubber particles-a bimodal or multimodal distribution are most apt to provide the optimum toughness.

A curing hardener can also be added to the above formulation. The preferred amount of hardener is about 1 to about 0.8 mole equivalent to that of epoxy component. A low molecular weight and high reactivity liquid acid is preferred. Suitable liquid acids include aliphatic carboxylic acid, aliphatic dicarboxylic acid, aliphatic anhydride, and aliphatic dianhydride, for example, Cyclohexane-1,2-dicarboxylic acid, 1,11-Undecanedicarboxylic acid 5-Oxo-2-tetrahydrofurancarboxylic acid, 1,3-Cyclohexanedicarboxylic acid, 5-methyl-cyclohexan-1,2-anhydride, and the like. If flexibilizing and toughening is introduced by the rubber or elastomer modified curing hardener, then polybutadiene modified aliphatic polyanhydride, polybutadiene modified aliphatic polyacide, and siloxane modified side chain dual-ended type acid or anhydride are preferred.

EXAMPLE 1

The elastomer modified epoxy can comprise an epoxy base resin reacted with a modifier. Suitable elastomer modified epoxies comprise a CTBN modified bishpenol A epoxy. Suitable base resins include any known epoxy, preferably EPON™ resins. Suitable modifiers include but are not limited to flexibilizers, glycidyl ethers, monofunctional glycidyl ethers, and polyfunctional glycidyl ethers, preferably HELOXY™ modifiers. It will be appreciated that modifiers can also serve as diluents. For example, HELOXY™ Modifier 68 is a diglycidyl ether of neopentyl glycol and is primarily used as a reactive diluent or viscosity reducing modifier for all classes of epoxy resins. EPON™ Resin 58034 is an elastomer modified epoxy functional adduct formed from the reaction of HELOXY™ 68 Modifier and a carboxyl terminated butadiene-acrylonitrile elastomer. The liquid epoxy adducted contains 40% Hycar 1300×13 CTBN rubber. Elastomer content is approximately 50 percent by weight. HELOXY™ Modifier 48 is a low viscosity aliphatic triglycidyl ether which can serve as a diluent or a modifier, preferably as a diluent.

Exemplary low stress epoxy compositions of the present invention were formulated using EPON™ Resin 58034 and EPON™ modifier 48 as described in Table 1. Hexamethylphosphoramide (HMPA) was used as a hardener in the ratio of 1:0.0 epoxy:hardener. An imidazole catalyst, 2E4MZ-CN, was used at about 2 wt % of the base resin. Loading level of reactive diluent of CTBN-modified epoxy/anhydride/imidazole base resins were assessed.

TABLE 1

Composition
EPON™ 58034
Structure

CH₂−CH(−O−)−CH₂−O−CH₂−C(CH₃)(CH₃)−CH₂−O−CTBN−O−CH₂−C(CH₃)(CH₃)−CH₂−O−CH₂−CH(−O−)−CH₂

| ID | Elastomer Modified Epoxy (wt %) | CTBN (wt %) |
|---|---|---|
| LS30 | 68.77 | 34.385 |
| LS31 | 67.89 | 33.95 |
| LS32 | 67.00 | 33.50 |
| LS33 | 66.13 | 33.065 |
| LS34 | 65.255 | 32.628 |
| LS35 | 64.39 | 32.195 |
| LS36 | 60.13 | 30.065 |
| LS37 | 55.99 | 28.0 |
| LS38 | 51.69 | 25.85 |
| LS39 | 48.05 | 24.03 |
| LS40 | 44.24 | 22.12 |

Composition
HELOXY™ Modifier
Structure

CH₃−CH₂−C(−CH₂−O−CH₂−CH(−O−)−CH₂)(−CH₂−O−CH₂−CH(−O−)−CH₂)−CH₂−O−CH₂−CH(−O−)−CH₂

| ID | Diluent (wt %) |
|---|---|
| LS30 | 0 |
| LS31 | 0.9856 |
| LS32 | 1.952 |
| LS33 | 2.9194 |
| LS34 | 3.8812 |
| LS35 | 4.8375 |
| LS36 | 9.5368 |
| LS37 | 14.1038 |
| LS38 | 18.544 |
| LS39 | 22.8626 |
| LS40 | 27.0645 |

Figure 1:
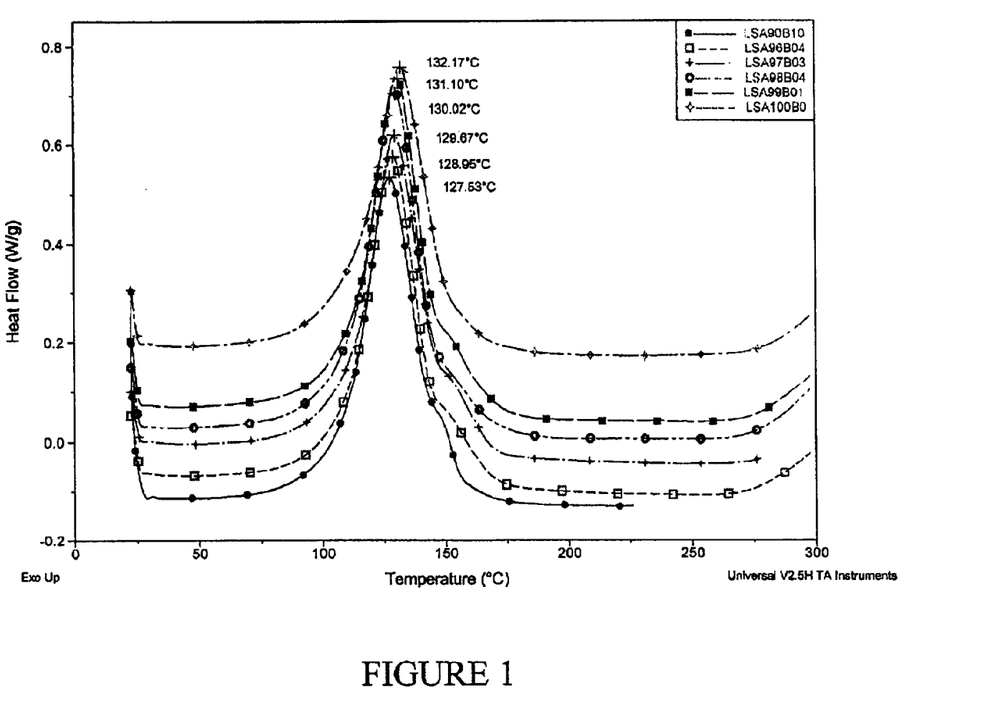
FIG. 1 is a graph showing DSC results over-layer of the formulation with weight percentage change in CTBN modified epoxy and EPON™ modifier 48.

Differential Scanning Calorimeter Analysis (DSC) is a measure of endotherm or exotherm of the polymerization during sample curing. FIG. 1 is a graph showing the change in the heat flow as a function of temperature as well as different formulations. The peak curing temperature is around 130° C. and gradually increases with the decrease of percentage of elastomer modified epoxy. 150° C./60 min with a heating rate of 10° C./min was selected as the curing procedure and all the samples used for series evaluation were cured according to this curing procedure.

Figure 2:
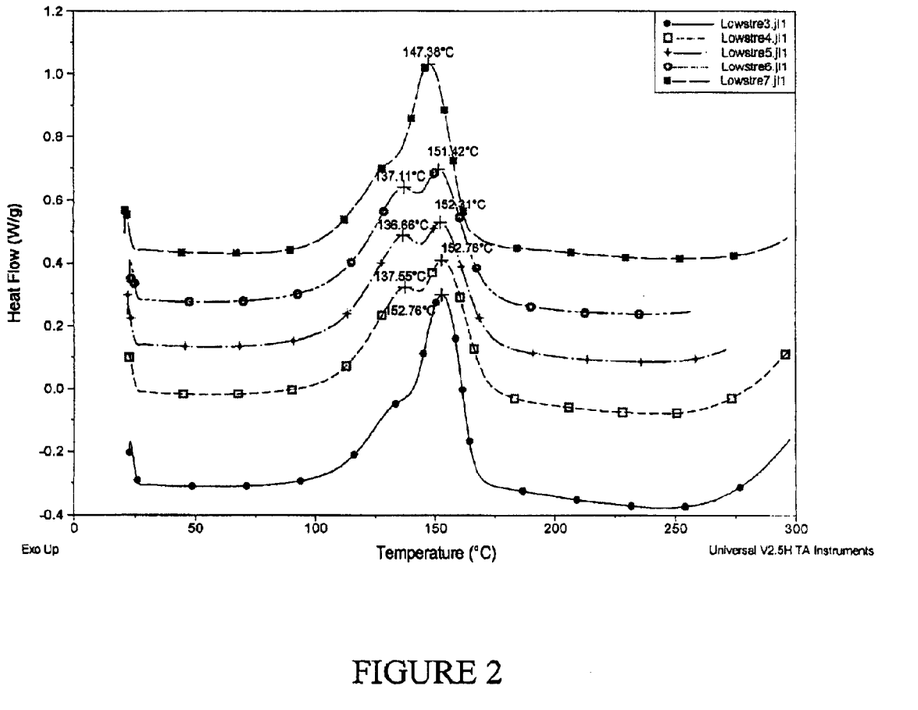
FIG. 2 is a graph showing DSC results over-layer of the formulations with weight percentage change in CTBN modified epoxy and bisphenol A (DER 332) epoxy.

Formulations using bisphenol A (D.E.R. 332) as a component instead of the diluent HELOXY™ Modifier 48 were conducted. FIG. 2 shows there are two peaks in the DSC curves. The main peak temperature remains approximately constant and is around 150° C., while the side peak, which corresponds to the bisphenol A epoxy, gradually shifts to the high temperature and finally merges into the main peak.

By comparing the above series of formulations, it was discovered that the using HELOXY™ Modifier 48 as a diluent generates a more flexible polymer. The modulus changed gradually with the increase of the loading level of HELOXY™ Modifier 48. For samples with the addition of bisphenol A, the modulus of the sample changed swiftly with a small variation of bisphenol A.

Figure 3:
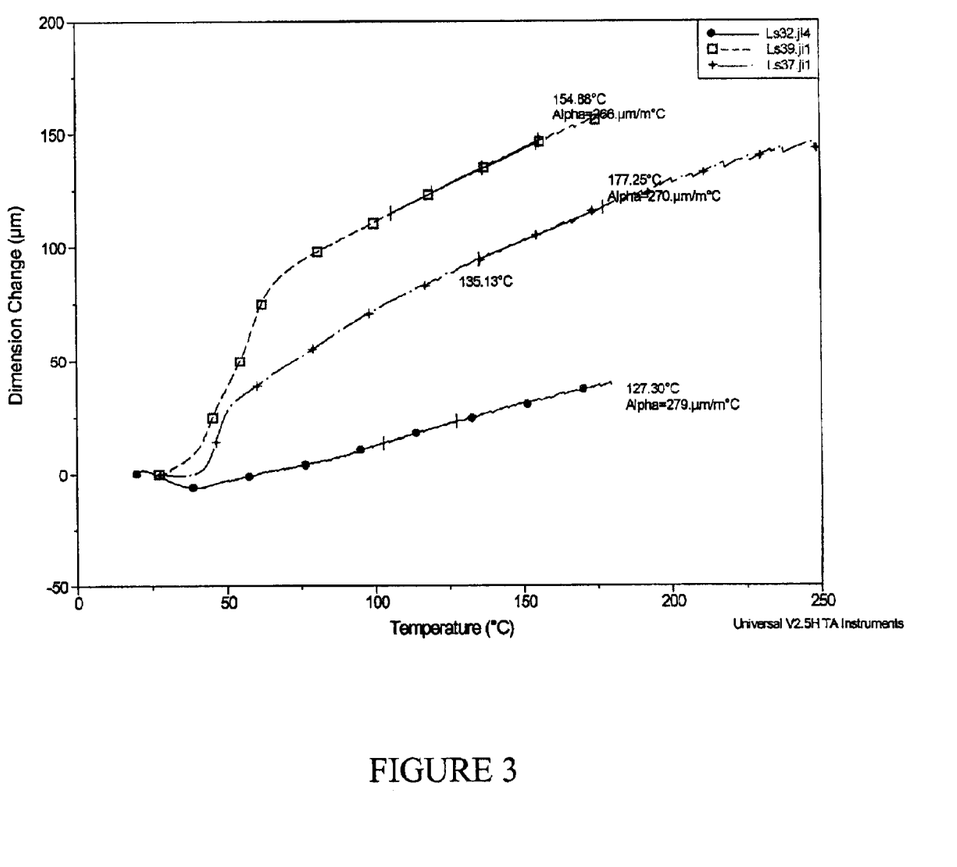
FIG. 3 is a graph of Thermal Mechanical Analysis (TMA) results of exemplary low stress epoxies.

Thermal Mechanical Analysis (TMA) is a common method to evaluate the property of thermal expansion of materials. Samples were tested at a temperature range of about 25 to about 250° C. with a heating rate of about 5° C./min. FIG. 3 is a graph of the TMA results. Coefficients of Thermal Expansion (CTEs) of the samples are within the range of 260 to 280 ppm, which is compatible to general silicone elastomer materials.

Dynamic Mechanical Analysis (DMA) is popularly used for testing storage modulus and loss modulus, which relate to the stiffness and damping property of the materials. The storage modulus value of conformal coating DC1-2577 (Dow Corning) was used as a standard for evaluating the candidacy of the developed materials to be a qualified conformal coating material.

Figure 4:
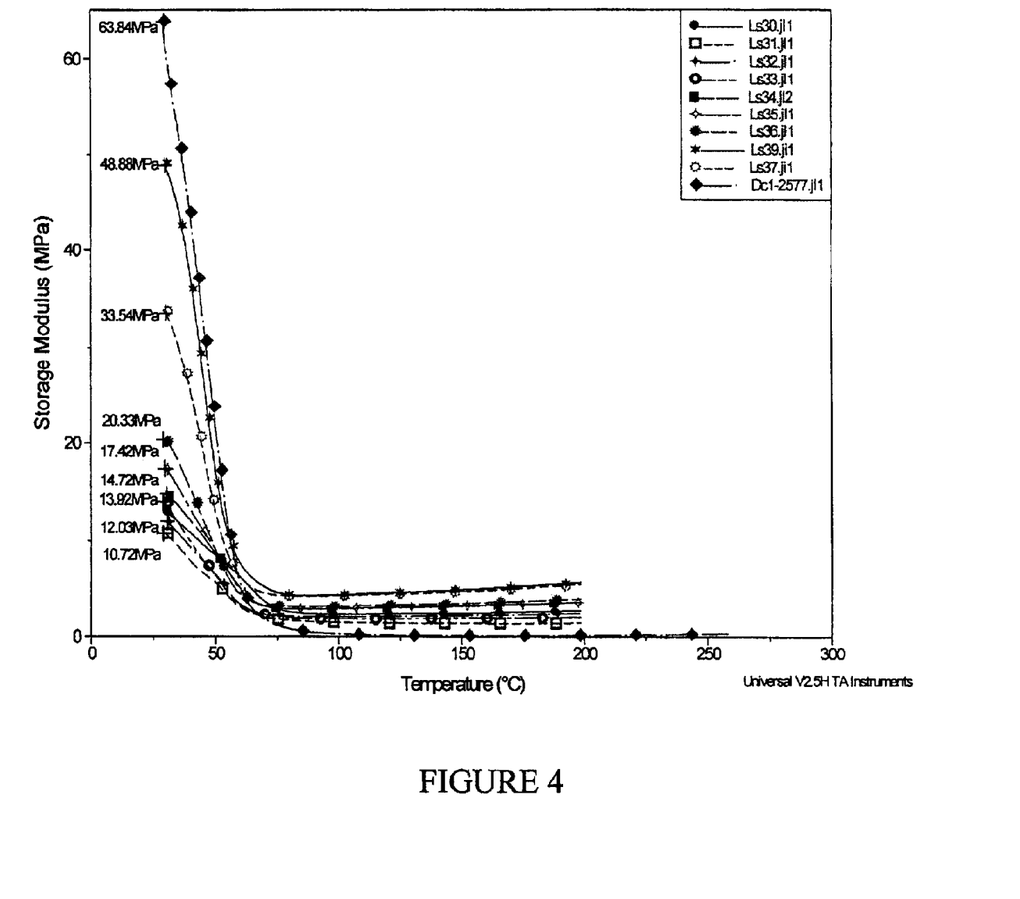
FIG. 4 is a graph showing that the storage modulus of exemplary low stress epoxies changes with the load level of diluent.

FIG. 4 illustrates a good relation between storage modulus and loading level of diluent. The addition of diluent increases the cross-linking density of the polymeric system. The shape of the DMA curve also indicates that the Tg of the low stress epoxies is within the temperature range of about 0 to about 50° C.

Rheology studies on these exemplary low stress candidates were generated by Rheometer 800 from TA instruments. As the reactive diluent loading percentage increases, viscosity gradually decreases with shear rate from 0 to 50 l/s at 25° C. All the low stress epoxy liquids exhibited approximate Newtonian behavior.

The principle effect of the elastomer on fracture is to allow the energy to be dissipated into a relative large volume of material at the crack tip. Elastomer particles are formed essentially by a precipitation process during copolymerization. The boundary between particle and matrix is diffuse and thus, under high stress, becomes a highly plasticized region such that shear deformation dominates and inhibits micro-crack initiation and propagation. The large plastic zone is therefore developed at the crack tip before local microcracks can coalesce and advance the main crack front. The development of the plastic zone is closely related to the increase in fracture energy. Thus, the elastomer has a major effect of increasing the deformation zone.

A mechanical stretching test was conducted on the series samples with a displacement rate control of 2.54 mm/min. Specifications of the samples are 1.5×0.5 in with a thickness of 0.04–0.055 in. Results (data not shown) indicated that the initial Young's Modulus increased with the loading level of reactive diluent increased because of the cross-linking density of polymer matrix itself increase. Percentages of elongation at break decreases with the diluent loading level increased first, and almost reached a minimum with 22.86 wt % diluent involved in the polymer system, then quickly changed.

Tensile strength and fracture energy almost showed the same trend. At low diluent loading level, tensile strength and fracture energy kept approximately constant. There was a small decrease when diluent involved percentage continued increasing. The minimum appeared at 14.10 wt % of diluent. After that point, tensile strength and fracture energy swiftly increased.

Figure 5:
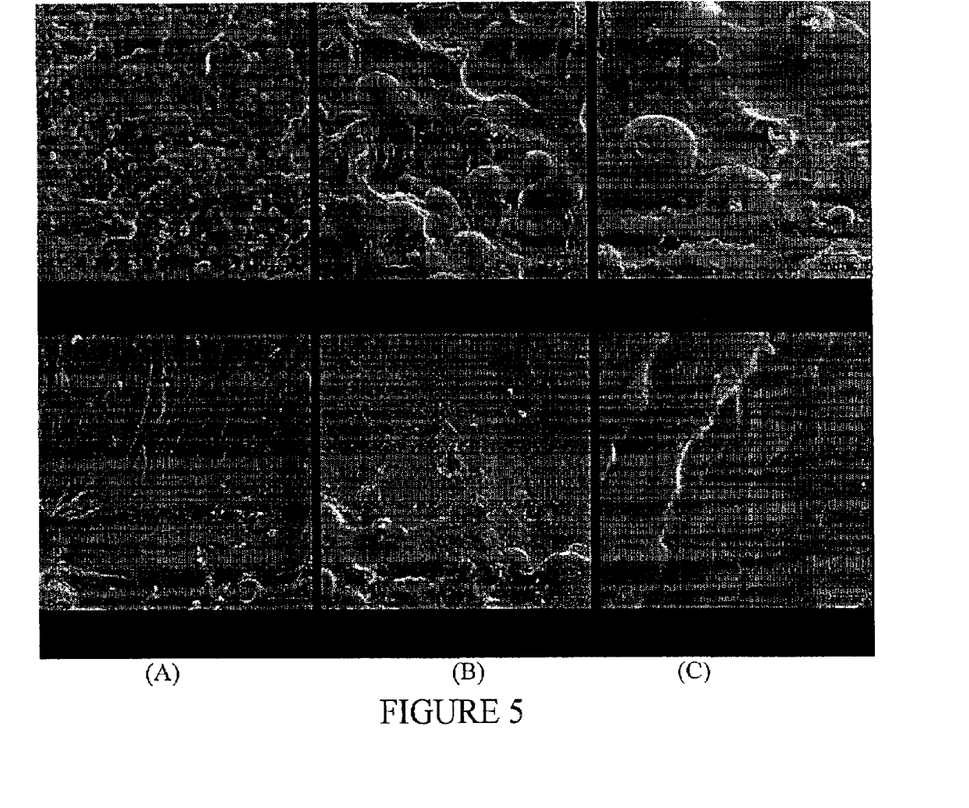

FIG. 5 is a scanning electron micrograph (SEM) of the sample morphology of a fractured surface of exemplary low stress epoxies. LS30, without diluent, shows a uniform dispersion and particle size (5 $\mu$m) of rubbery particles in the soft polymer matrix. Sample 36 (Max. 20 $\mu$m) with 9.54 wt % diluent contains different size particles. While particle size of sample LS40 (Max. 40 $\mu$m) with 27.06 wt % diluent is even more non-uniform. The synergetic effect of the multi-particle system is therefore apparent, and a multiplicity of failure sites can be seen in a FIG. 5 of a CTBN-modified epoxy copolymer system. With the crack traveling, bright streamer markings were the result of the tearing of ligaments as the crack began to advance. It also can be observed that a severe plastic deformation was taken place before the fracture occurred and the fractures always circumvent the particles.

Another embodiment of the present invention provides a curable silicone composition for preparing a conformal coating, the composition including a silicone base resin, preferably a siloxane elastomer, a catalyst, a filler in an amount sufficient to impart fuel contamination resistance, a coupling agent, and optionally a diluent. The cured composition can be a soft, thermoset gel or a compliant, elastomer, and optionally can be cured at about room temperature (RT).

Silicone based resins including elastomers are known in the art and commercially available. Suitable silicone based resins include, but are not limited to, two-component siloxanes for example a vinylterminated dimethylsiloxane or vinylterminated methylphenyl siloxane and hydrogenterminated dimethylsiloxane curing agent. An exemplary silicone base resin includes Q1-4939 from Dow Corning, Midland, Mich.

Catalysts are also known in the art and commercially available. Suitable catalysts include but are not limited to metal chelate catalysts, preferably platinum catalysts, most preferably zero valent platinum catalysts as well as any catalyst for accelerating hydrosilylation or crosslinking. The acceleration rate of the catalyst is dependent on the solvent (inhibitor) added with the catalyst. Suitable solvents for use with the catalysts include but are not limited to xylene, linear siloxane, preferably divinyl tetramethyl, and cyclic silicone or vinyl cyclic. Exemplary platinum catalysts include PC072, PC075 and PC085 available from United Chemical Technologies, Inc. Their concentration in the base resin can be from about 5 ppm to about 150 ppm, preferably about 15 ppm to about 85 ppm, most preferably from about 20 ppm to about 35 ppm, depending on the curing temperature and time desired. The tack free time (curing time) of the silicone system of the present invention at room temperature can be varied from about 2 to about 12 hrs with one of the three platinum catalysts with its concentration ranging from about 5 ppm to about 150 ppm.

Inorganic fillers including but not limited to silica can function to enhance siloxane's chemical resistance to the contamination of jet fume. The size of the silica can be from about 0.1 mm to about 50 mm, and the amount of the silica can be from about 5 to about 40 weight percentage of the base resin.

The formulations of the present invention can include other additives such as coupling agents or adhesion promoters and fillers to complement the physical and chemical properties of the formulations. For example, one or more commercially available coupling agents can be employed to facilitate blending of filler components with the resin composition as well as enhancing the adhesion between the conformal coating and polyimide passivated Si substrate. Coupling agents, for example, organofunctional silane coupling agents sold by Dow Corning, in particular Silanol, can be employed, often in trace amounts but generally from about 0.1 to 5 about 5 weight percentage of the base resin.

Low boiling point organic solvents can be used as a diluent, if needed. Suitable diluents include cyclohexane, toluene, tetrahydrofuran, methyl ethyl ketone, and the like. The amount of diluent in the base formula can be from about 1 to about 20 weight percentage of the base resin.

Silicone elastomers, including, two-component siloxane have comparatively high crosslink density, which helps provide its super flexibility, low moisture absorption and durability. Such elastomers have been adopted for a great variety of delicate device applications besides its sealing and potting generic advantages. However, its low polarity of structure results in poor resistance to low molecular hydrocarbons, such as octane. One embodiment of the present invention provides silicone compositions having greatly improved resistance to jet fume by the inclusion of silica, preferably highly polar silica. The labor and power saving room temperature curing procedure can be accomplished by using a platinum-based catalyst. Notably, the modified material still keeps all the intrinsic merits of siloxane, such as low Tg ($\leq$−120° C.), low modulus, good thermal stability, low moisture uptake and excellent durability.

EXAMPLE 2

Three different coordinate-solvent-dissolved platinum catalysts were evaluated to polymerize exemplary low stress curable silicone compositions for preparing a conformal coating at room temperature. It was found that hydrosilylation can be initiated at much lower temperatures, even at room temperature with comparative curing time. The three catalysts are 1) Platinum divinyl tetramethyl siloxane, in a xylene solution; 2) Platinum divinyltetramethyl siloxane, in a linear vinylsilicone; 3) Platinum divinyltetramethyl siloxane, in a vinyl cyclic carrier. Because the platinum complex dissolved in different degrees of inhibitors, their ability of acceleration is different. The catalysts can be about 5 to about 150 ppm, preferably about 15 to about 85 ppm, most preferably about 20 to about 35 ppm. The curing procedure was improved from original 150° C. 2 hrs to room temperature with different cure times depending on the catalyst being used as shown in Table 2.

TABLE 2

| Catalyst | Concentration (ppm) | Maximum Cure Time (hours) | Presence of Bubbles |
|---|---|---|---|
| PC072 | 45 | 0.7 | yes |
|  | 31.5 | 1 | yes |
|  | 27 | 1.8 | yes |
|  | 23 | 1.5 | yes |
| PC075 | 45 | 1.5 | few |
|  | 30 | 2.0 | fewer |
|  | 20 | 6 | no |
| PC085* | 150 | 2 | yes |
|  | 96 | 2 | yes |
|  | 66 | 2.5 | yes |
|  | 44 | 2.8 | few |
|  | 22 | 6 | no |
|  | 13 | 8 | no |
|  | 6.75 | can be cured at RT | no |

*Add 2 wt % of silane into the formulations.

Figure 6:
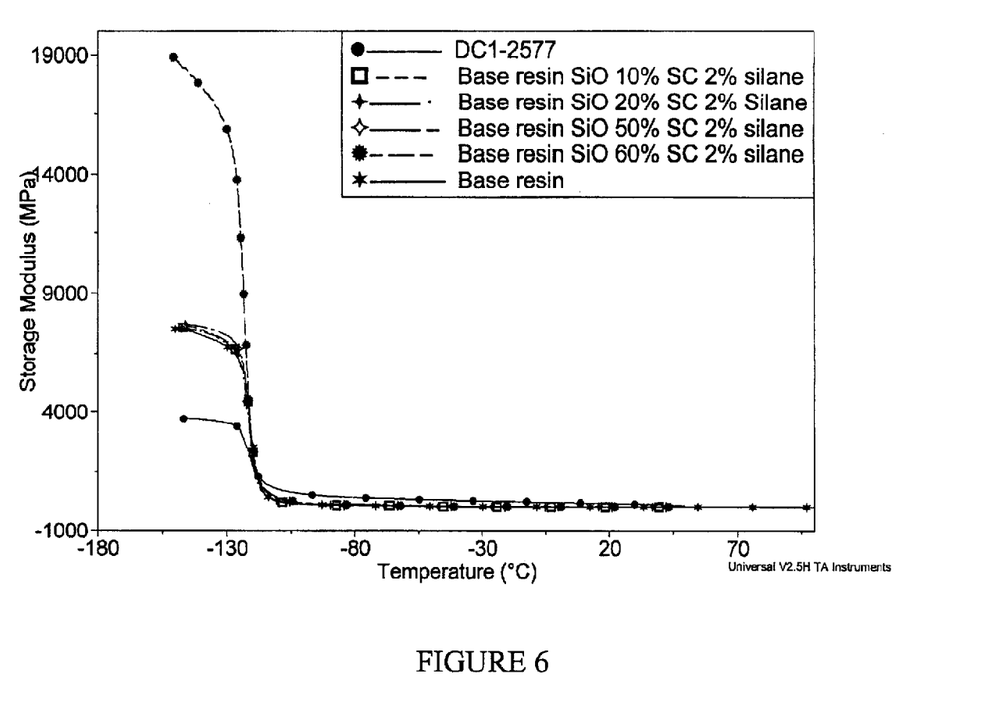
FIG. 6 is a graph showing storage modulus changes with filler loading percentage on exemplary low stress silicone compounds using DC1-277 as a control.

Suitable silicone base resins include Q1-4939 from Dow Corning. To increase the resistance to the jet fuel contamination, some inorganic filler, silica, was put into the base resin system. It will be appreciated any other inorganic fillers can be used, preferably polar inorganic fillers. DMA tests were performed to verify that the filler loading did not change the storage modulus of the materials too much. FIG. 6 illustrates that the Tgs of the series keep lower than −120° C. When the temperature is below Tg, the storage moduli of the series are higher than that of control sample (DC1-2577). However, the storage moduli of the series are lower then that of control samples once the temperature is higher than their Tgs. Thus, the silicone compositions of the present invention can meet the low internal stress (formed by temperature variation and material processing) requirement.

TABLE 3

Mechanical properties vs. Filler loafing percentage on Q1-4939 series

| Formulation | Elongation L-Lo/Lo (%) | Max. Force (N) | Work (Joules) |
|---|---|---|---|
| Base resin + 60 wt % SiO$_2$ + 30 ppm PC085 | 229.7486 | 12.7 | 231.74 |
| Base resin + 50 wt % SiO$_2$ + 30 ppm PC085 | 245.7142 | 13.5 | 235.89 |
| Base resin + 40 wt % SiO$_2$ + 30 ppm PC085 | 292.9451 | 9.9 | 178.94 |
| Base resin + 30 wt % SiO$_2$ + 30 ppm PC085 | 297.9736 | 12.6 | 233.26 |
| Base resin + 20 wt % SiO$_2$ + 30 ppm PC085 | 285.595 | 11.5 | 186.54 |
| Base resin + 10 wt % SiO$_2$ + 30 ppm PC085 | 299.3923 | 8.4 | 151.71 |
| Base resin + 30 ppm PC085 | 334.9625 | 7.1 | 134.95 |
| Base resin + 60 ppm PC085 | 336.3694 | 15.6 | 228.2 |

Table 3 shows that as filler loading increases, elongation decreases, maximum force increases and toughness increases. The change in mechanical properties indicates that as filler loading increases, the material's flexibility decreases, but toughness increases.

Figure 7:
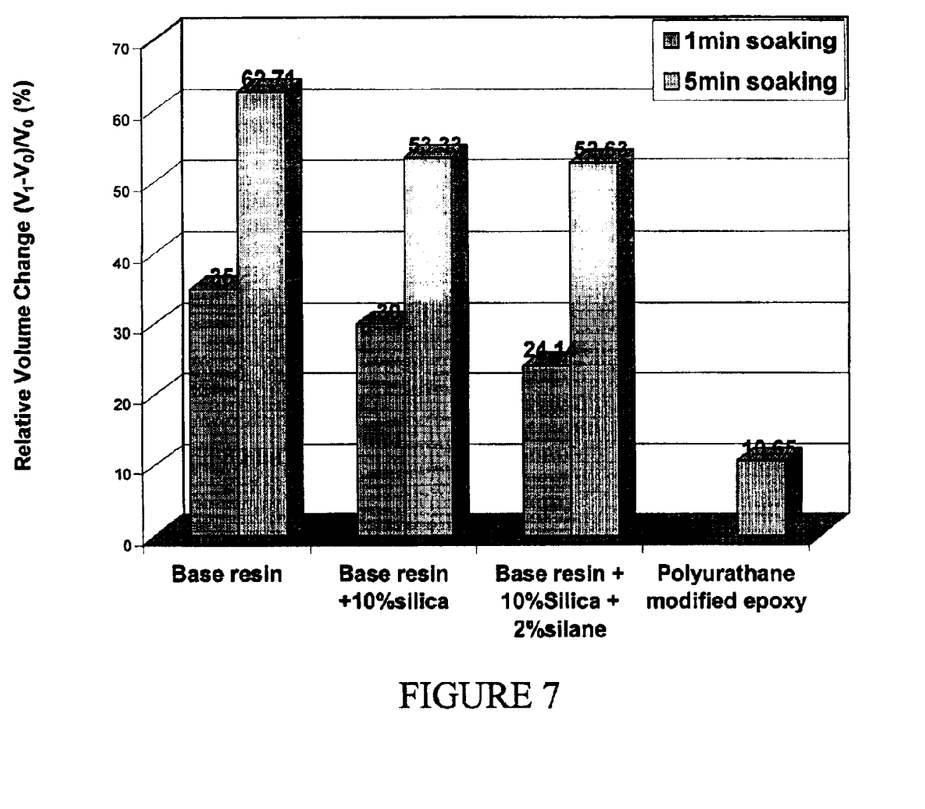
FIG. 7 is a histogram showing material swelling vs. filler loading percentage of Q1-4939 base and polyurethane modified epoxy.

Chemical resistance tests were performed on the silicone base resins (cured at 150° C. for 2 hrs) with or without filler loading and with or without silane adhesion promoter (FIG. 7). The results of 1 min immersion in gasoline indicates that 10% filler loading can reduce the volume swelling from 35% to 30% of their original volume, respectively, a 14.29% reduction. The addition of silane can further enhance the volume change resistance because of the slight cross-link density increase of the bulky siloxane. This difference is 23.14%.

FIG. 7 is a histogram showing gasoline contamination resistances of the resins cured at room temperature for 6 hrs with and without filler loading or silane. Contamination resistance was investigated by measuring the volume change before and after immersion in gasoline. The swelling property of polyurethane modified epoxy was also listed in the FIG. 7. Its volume change after 5 mins immersion in gasoline is 10.65% of its original. However, its Tg is higher than −65° C.

There is a significant difference among the samples with or without filler loading or silane. Results in FIG. 7 indicate that the addition of filler and silane will reduce the swelling of the material system because of the improvement of oil-philic property and crosslinking density. The catalyst used for accelerating the curing is PC085 at about 30 ppm concentration.

Figure 8:
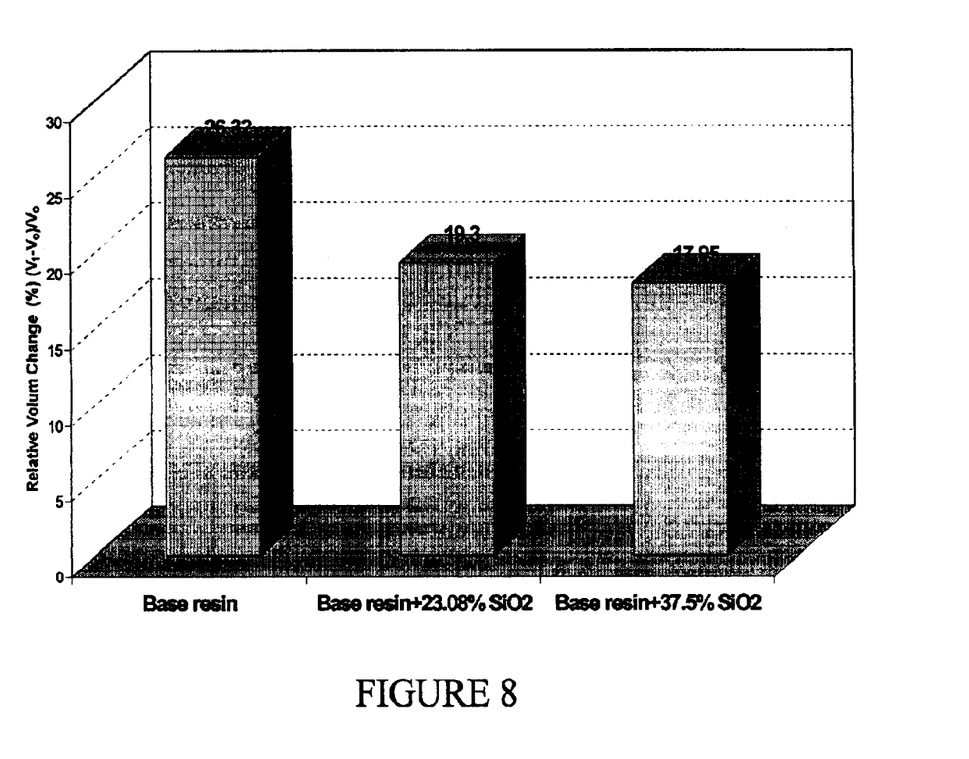
FIG. 8 is a histogram showing material swelling vs. filler loading percentage on room temperature cured Q1-4939 resin (after immersion in jet fume for 5 min).

FIG. 8 is a histogram showing the results from a volume swelling test (immersion in gasoline for 5 mins). The data show that the use of the catalyst can reduce the volume swelling from 62.7% to 26.32%. As filler loading increased from 0% to 23.0% to 37.5%, the volume swelling reduce from 26.32% to 19.3% to 17.95%. The trend of chemical resistance improvement vs. filler loading shows an exponential decrease.

Figure 9:
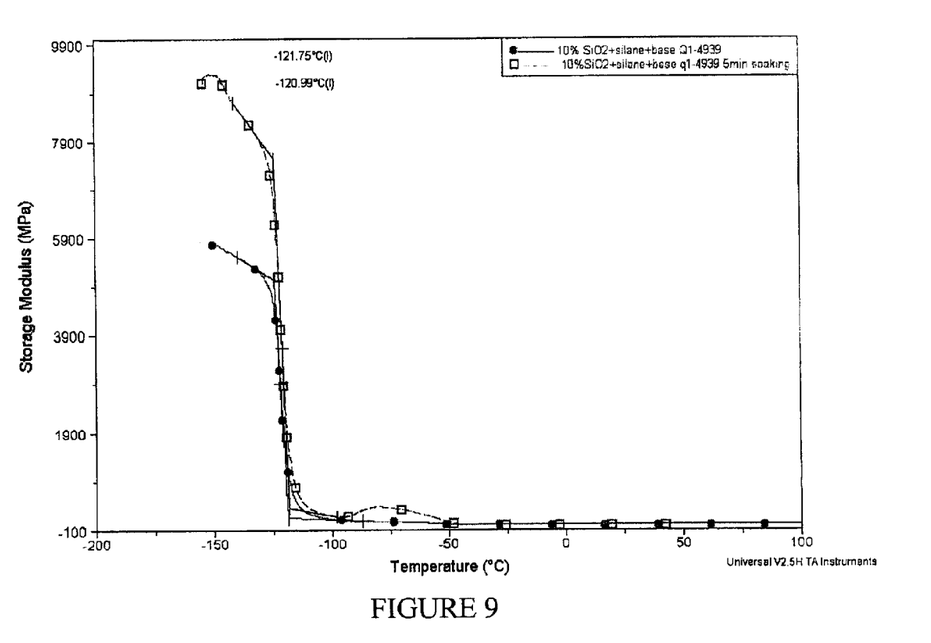
FIG. 9 is a graph comparing moduli of high temperature curable resin before and after soaking in gasoline for 5 mins.
Figure 10:
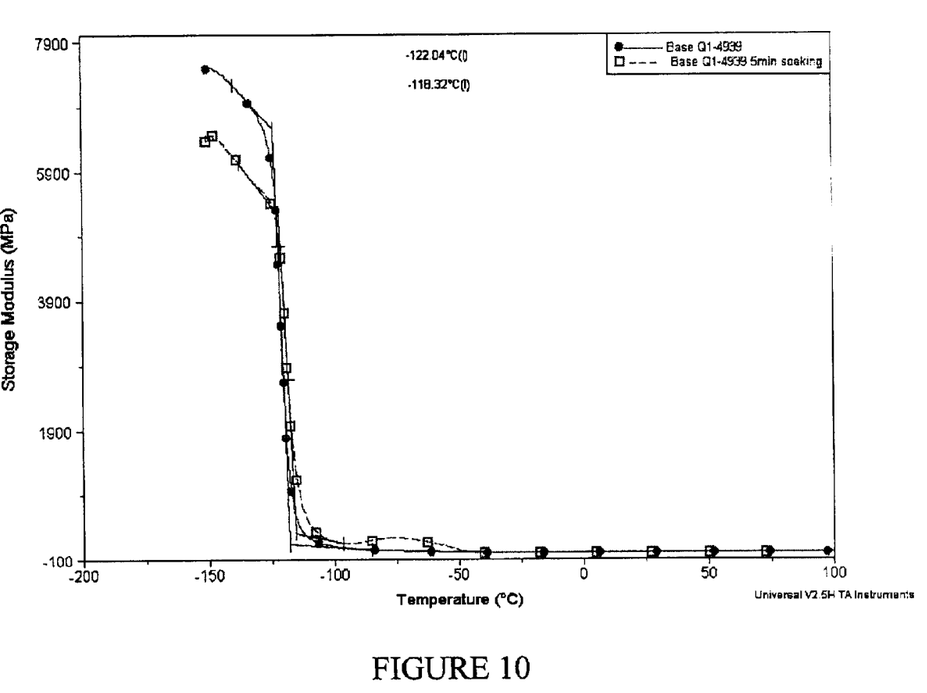
FIG. 10 is a graph comparing moduli of RT curable resin before and after soaking in gasoline for 5 mins.

Moduli of the siloxane compositions before and after fuel contamination were also investigated. Gasoline contamination will not affect the chemical structure of the siloxane. Tgs of the materials before and after immersion in gasoline are almost identical whether it is filler loaded RT curable resin base (FIG. 10) or non-filler loaded high temperature curable resin base (FIG. 9).

Surface Insulation Resistance (SIR) changed with 85° C./85% RH aging under interval 160 v bias for resistance test is a standard method for the reliability evaluation of conformal coatings for the aerospace application. The SIRs of the developed silicone based conformal coatings changed with aging time up to 898 hrs. All the samples still maintain SIRs above $10^8$ Ohms except sample Q1-4939+additive+ additional cure. A swift transition occurred around 220 hrs. It can be also observed that there is no significant difference in the SIRs between samples with and without 80° C./15 min thermal curing. The data suggests that the new conformal coating can be filly cured at room temperature (RT).

The present invention includes low stress siloxane-based conformal coating having excellent resistance to the contamination of jet fuel compared to the DC1-2577 used for previous light test as determined by the reduction in swelling. The compositions have good fluidity and can be cured at room temperature and become tack free within 5 hrs. Modulus of the developed conformal coating is lower than DC1-255 within application temperature (−55~140° C.). It also has good flexibility and durability as well as extremely low Tg.

Results from SIR reliability test indicate that the new conformal coatings exhibit qualified insulation electrical property after exposure to 85% Rh/85° C. environmental stress for 900 hrs.

It will be apparent that the above described illustrative embodiments of our low stress conformal coatings are capable of obtaining the above stated objects and advantages. It will be appreciated that those skilled in the art may make modifications in the formulations for our coatings without departing from the spirit of our invention.

What is claimed is:

1. A curable epoxy composition for forming a conformal coating, the composition comprising:
   an elastomer modified epoxy base resin, wherein the base resin in about 44 to about 70 wt %;
   a reactive diluent, wherein the reactive diluent is 9.5 to about 30 wt %;
   a catalyst; and
   a hardener.

2. The conformal coating of claim 1, wherein the epoxy base resin is modified with rubber, siloxane or urethane oligomer.

3. The conformal coating of claim 1, wherein the modified epoxy is selected from the group consisting of flexible aliphatic epoxide, aliphatic diepoxide, aliphatic multiepoxide, and mixtures thereof.

4. The conformal coating of claim 1, wherein the modified epoxy is modified by a flexible organic modifier selected from the group consisting of carboxylic acid terminated butadiene acrylonitrile, polycarboxylic acid terminated butadiene acrylonitrile, epoxide terminated butadiene acryonitrile, siloxane modified epoxy, siloxane modified amine, epoxide polyurethane and mixtures thereof.

5. The conformal coating of claim 1, wherein the hardener is selected from the group consisting of carboxylic acid, carboxylic diacid, carboxylic acid anhydride, and carboxylic acid dianhydride.

6. The conformal coating of claim 1, wherein the organic reactive diluent is selected from the group consisting of aliphatic epoxide, aliphatic alcohol, aliphatic alcohol, and aliphatic dialcohol.

7. The conformal costing of claim 1, wherein the catalyst is selected from the group consisting of tertiary amines, tertiary phosphines, imidazole and its derivatives, imidazolium salts, onium salts and the mixtures thereof.

8. A conformal coating formed by reacting:
   an elastomer modified epoxy base resin, wherein the base resin in about 44 to about 70 wt %;
   a reactive diluent, wherein the reactive diluent is 9.5 to about 30 wt %;
   a catalyst; and
   a hardener.

9. A kit for forming a conformal coating, the kit comprising:
   an elastomer modified epoxy base resin, wherein the base resin in about 44 to about 70 wt %;
   a reactive diluent, wherein the reactive diluent is 9.5 to about 30 wt %;
   a catalyst; and
   a hardener.

10. A method for protecting electronic devices, the method comprising:
    applying a conformal coating to the device, wherein the conformal coating is produced by reacting an elastomer modified epoxy base resin, wherein the base resin in about 44 to about 70 wt %; a reactive diluent, wherein the reactive diluent is about 9.5 to about 30 wt %; a catalyst; and a hardener.

* * * * *